March 19, 1968     C F GRAY     3,374,087
PRODUCTION OF IRON
Filed Nov. 10, 1965
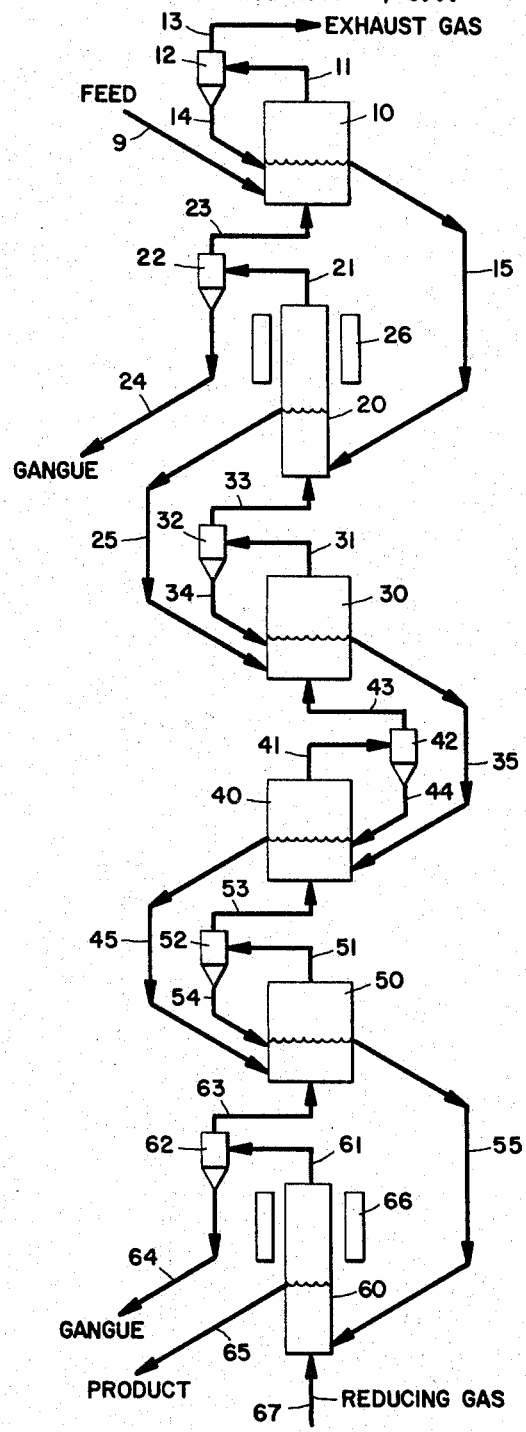
INVENTOR
C F GRAY
BY Llewellyn A. Proctor
PATENT ATTORNEY

United States Patent Office 3,374,087
Patented Mar. 19, 1968

3,374,087
PRODUCTION OF IRON
C. F. Gray, Baton Rouge, La., assignor to Esso Research and Engineering Company, a corporation of Delaware
Filed Nov. 10, 1965, Ser. No. 507,137
10 Claims. (Cl. 75—26)

ABSTRACT OF THE DISCLOSURE

The present invention is concerned with a process for the production of metallic iron from particulate iron ores. Ore, which contains a considerable amount of gangue, is fed into the process, separated into a series of beds, fluidized by gas, and progressively reduced at elevated temperatures. The specific improvement takes advantage of the staging and the fact that certain amounts of gangue can prove beneficial in suppressing bogging, and utilizes a combination of magnetic separation and gas elutriation steps for retention of critical portions of gangue within the fluidized beds while the ore is being reduced. In accordance therewith, magnetic separation and elutriation steps can be employed in those beds wherein ore is being reduced to magnetic oxide of iron, and in the final bed where the ore is metallized.

---

The art is replete with disclosures of processes wherein metallic iron is produced by direct reduction of iron ore, e.g., oxidic iron ores, i.e., ores containing or consisting essentially of oxides of iron, in fluidized solids systems. The charges or feeds to such systems are "refined" particulate solids or select mixtures containing iron-bearing minerals. Thus, in the natural state, iron ores are composed of two parts: a part which bears iron minerals in kind and amount suitable for recovery, and another part which contains iron or other minerals in kind and amount unsuitable for recovery. The latter is known as the gangue of the ore. Though both are present in a crude or unrefined ore, after removal of the gangue the refined product is simply known as iron ore.

Prior to the reduction in a fluidized iron ore reduction process, beneficiation techniques are used to concentrate and obtain the suitable iron-bearing minerals, or iron ore, which shall constitute the charge to a process. Beneficiation contemplates the crushing of hard, lumpy ores, and the concentration and agglomeration of fines. It also contemplates screening and exclusion of certain low grade "ores," as well as blending and concentrating the iron-bearing minerals to obtain the desirable iron ore. The concentration steps may also involve washing techniques, jigging, fines grinding, drying, flotation and magnetic concentration, or any combination of these and other techniques. The separated gangue is discarded. The greater the amount of the beneficiation that is necessary, the greater the cost of operating iron ore reduction processes.

In the more sophisticated iron ore reduction processes, the refined ore is charged to a series of step-wise reductions in staged beds, or zones, wherein the ore is fluidized by ascending reducing gases, generated externally or in situ, while the ore flows countercurrently from one staged bed, or zone, to another. In such process, gaseous components are oxidized simultaneously with the reductions. Hence, as the ore flows downwardly from one bed to another, the ore is reduced, e.g., from ferric oxide to magnetic oxide of iron (or mixture approximating the magnetic oxide of iron formula) and thence from magnetic oxide of iron to ferrous oxide. In a final stage, or stages, i.e., in a ferrous reduction zone, the ferrous oxide is reduced to metallic iron. Generally, the iron product from the final ferrous reduction zone is from about 85 to about 95 percent, and higher, metallized.

Temperatures in the several fluidized stages should be maintained as high as possible, at least up to some temperature below the sintering temperature of the ore which, for most ores, is not more than about 1800° F. Thus, to achieve maximum reduction, and greater rates of reaction, high temperatures are desirable. High temperatures, however, produce, or tend to produce, "bogging," this occurring below the sintering temperature of the ore. Bogging, which increases in severity with increasing temperature, is characterized by a "stickiness" which occurs at the surfaces of the individual iron ore solids particles. Bogging, however, can completely disrupt the fluidized process and is most acute in the ferrous reduction stage, or stages, wherein metallization occurs. Its severity increases with increasing metallization. Nodules or "whiskers" of alpha-iron or microscopic size form on the surfaces of the iron ore solids particles during metallization, and it is believed that the nodules of different particles contact and attach one to another to weld together and form aggregates or agglomerates. Where loss of fluidization of a bed occurs, operation becomes inefficient, and often impossible. The severity of the problem is even further intensified with certain types of reducing gases, e.g., gases of high hydrogen concentration.

Bogging, then, presents a dilemma. High temperatures are desired to achieve more efficient reduction and faster reaction rate. High metallization is also desired, and indeed essential for commercial considerations. However, the higher temperatures and metallizations increase the tendency toward bogging. Compensating temperature reductions and decreased metallizations are thus necessary, these lessening the overall efficiency of the process.

With certain ores, e.g., specular ores, the tendency to bog under these conditions is especially severe, and for this reason it is difficult to treat such ores in fluidized iron ore reduction processes.

The primary objective of the present invention is to provide a process which will obviate the necessity for beneficiations, as well as to lessen the problem of bogging. A specific object is to provide a simplified, new, and novel fluidized iron ore reduction process for beneficiation of ore in situ, which process simultaneously suppresses bogging. It is also an object to provide such process which lessens, and in some cases eliminates, the need for anti-bogging additives which often have adverse side effects. A further object is to provide such process wherein reduction is achieved in several stages to convert particulate iron ores, especially oxidic iron ores, to lower stages of oxidation and finally to metallic iron while also providing for removal of gangue from the ore. A further object is to provide such process wherein significant concentrations of hydrogen can be used as the reducing gas, whether added to the process ab initio or generated in situ.

These objects and others are achieved in accordance with the present invention which contemplates a process employing a series of steps wherein a relatively crude particulate iron ore, or ore containing gangue, is beneficiated in situ within the fluidized iron ore reduction process by elutriation with gases. Particulate gangue-containing ore is charged directly to and is passed through a series of reduction stages and, in a final ferrous reduction stage, the gangue is finally separated by elutriation with gases. The ore is reduced to substantially metallic iron and recovered.

The process utilizes, as feeds, high gangue ores which can be beneficiated during reduction of the ore. By leaving all or substantial portions of gangue within the particulate ore initially charged to the process, the normal tendency of the ore to bog during the reduction is substantially lessened. Having served such useful purpose, the gangue can then be beneficiated in a final stage of the process by elutriation with gases without all of the expense and trouble of the usual beneficiation procedures which involve the normal preliminary separations. The common gangue impurities do not reduce at the desirable operating temperatures so as to cause contamination of the metallic iron product.

In the preferred process, a particulate raw ore, e.g., hematite ($Fe_2O_3$), is fed into an initial stage of a series of iron ore reduction stages and preliminarily treated at low temperatures ranging, e.g., on the order of from about 1000° F. to about 1600° F., and more preferably from about 1100° F. to about 1300° F. to form substantially magnetic oxide or iron, or magnetite ($Fe_3O_4$). Following the preliminary treatment, if desired, a partial preliminary elutriation can be effected by passage of a relatively high velocity gas stream through the stage to separate a portion of the gangue. Removal of the magnetic oxide of iron from the stage during this step is prevented by imposition of a magnetic field to hold back the magnetic particles.

This preliminary or initial elutriation step is provided where there is an excess of gangue in the ore. Sufficient gangue is removed from the ore to provide a gangue-ore mixture ranging from about 3 to about 30 and preferably from about 5 to about 20 percent gangue, based on the weight of the ore. Though the exact amount of gangue required will depend upon the specific bogging characteristics of each ore, this amount of gangue is usually sufficient to effectively suppress the normal tendency of even a specular ore to bog. To effect the desirable degree of elutriation, gas velocities (superficial linear velocities) ranging on the order of about 1 to about 12, and preferably from about 4 to about 8 feet, per second are passed through the reaction stage, and a sufficient magnetic field is imposed across the stage to hold back the magnetite particles.

The gangue-ore mixture, following the preliminary elutriation, is then passed through a series of reduction zones wherein the magnetic oxide of iron is reduced to substantially ferrous oxide. The ferrous oxide is then progressively metallized in a plurality of ferrous reduction zones.

The process contemplates a final ferrous reduction stage wherein the ferrous oxide is reduced to from about 70 to about 98 percent, and preferably from about 80 to about 95 percent, metallic iron, this being the final elutriation stage, or zone. In this zone, the entering gases are maintained at relatively high velocities to remove the gangue from the final reduced product. A magnetic field is utilized to prevent substantial loss of the metallized product from the zone. Generally, gas ranging in velocity from about 1 to about 15 feet per second, and more preferably from about 5 to about 9 feet per second, is passed through this zone to effect the elutriation.

In most instances, effective separation is provided in the elutriation zones by employing magnetic strengths ranging from about 20 to about 500 gauss, and more preferably from about 50 to about 200 gauss.

The invention will be better understood by reference to the attached flow diagram or drawing, and to the following detailed description which makes specific reference to the diagram.

Referring to the figure is shown a series of reaction vessels 10, 20, 30, 40, 50, 60. Each constitutes a stage of an iron ore reduction process wherein, e.g., ferric oxide, or hydrate form thereof, is reduced to substantially metallic iron. Each reactor of the series is provided with an overhead take-off line for removal of gases—viz., lines 11, 21, 31, 41, 51, 61. Each take-off line is connected into a cyclone separator 12, 22, 32, 42, 52, 62; each cyclone is provided with a line for removal of gases—viz., lines 13, 23, 33, 43, 53, 63; and with a line for removal of solids from a cyclone—viz., lines 14, 24, 34, 44, 54, 64. In each instance, gases from a separator are fed into a preceding zone of the series except in the case of cyclone 12 which handles the spent or exhaust gas which can be regenerated by removal of oxidation products, if desired, and recycled to the process. In each instance, also, the solids are fed or recycled back into the respective reactor except in the instance of reactors 20, 60 wherein the gangue can be or is removed from the process. Each reactor of the series contains a fluidized bed formed by ascending gases and each reactor 10, 30, 40, 50 is of generally the same size, except for reactors 20, 60 which have a relatively large length in relation to the diameter. Overflow of fluidized solids from one reactor to a next reactor of the series to control bed level is via lines 15, 25, 35, 45, 55. Reactors 20, 60 are provided with magnets 26, 66 adjacent thereto for effecting elutriation.

A gangue-ore mixture is fed into reactor 10 via line 99 and flowed downwardly from one reactor or stage to the next succeeding stage of the series. The gangue-ore mixture is thus reduced at relatively low temperature in reactor 10 to substantially magnetic oxide of iron, which product is transferred via line 15 to reactor 20.

Reactor 20 constitutes the preliminary elutriation stage. The bed therein is generally maintained in fluidized phase, and is operated at temperatures ranging generally from about 1000° F. to about 1410° F., and preferably from about 1100° F. to about 1300° F. The reactor is provided with an adjacent magnet 26 which sets up a magnetic field through a portion of the reactor, and it is characterized as one having a relatively large length:diameter ($L/D$) ratio. The $L/D$ ratio is selected to provide the desirable gas velocity through the zone and a magnet of proper field strength is provided to prevent escape of the magnetic oxide of iron as gases ascend through the reactor at relatively high velocity.

The next three reactors, or stages, of the series—viz., reactors 30, 40, 50—contain fluidized beds and are operated at temperatures ranging generally from about 1200° F. to about 1600° F., and preferably from about 1300° F. to about 1500° F. Within reactor 30, magnetic oxide of iron is reduced to substantially ferrous oxide. Reactor 40 constitutes the first ferrous reduction stage of the series. Preferably, metallization within this reactor ranges from about 20 to about 70 percent, and more preferably from about 40 to about 50 percent. Reactor 50 is also a ferrous reduction stage and therein metallization ranges generally from about 70 to about 90 percent, and generally no higher than about 80 percent.

Reactor 60, the last stage of the series, is the final elutriation stage as well as a ferrous reduction zone wherein metallization ranges generally from about 70 to about 98 percent, and preferably from about 80 to about 95 percent. The reactor 60 is generally operated at temperatures ranging from about 1100° F. to about 1500° F., and preferably from about 1200° F. to about 1300° F. Reducing gases, generally containing up to about sixty percent hydrogen, can be fed into this stage. While reactor 60 can be of the same $L/D$ ratio as reactor 20 of the series, a smaller or larger $L/D$ ratio can be provided as desired. In certain circumstances, it can even be desirable to provide a highly turbulent bed. The field force imparted across the bed by magnet 66 adjacent the reactor is sufficient to prevent substantial escape of magnetic particles from the zone. The nonmagnetic portion of the particles separated from the stage is removed from cyclone separator 62 via line 64 and the product is removed via line 65.

The fresh reducing gas introduced via line 67 directly into reactor 60, with regenerated make-up gas if desired, is passed through the series of reactors at desired velocities easily determined and provided by selection of reactors, or stages, of desirable $L/D$ ratios. Reaction conditions in reactors 20, 60, especially the latter, are the most critical of the series. In the latter reactor 60, the particulate highly metallized iron product must be prevented from escaping the reactor, but sufficient quantities of the gangue must be blown therefrom, and the metallic product separated. In reactor 20, effective separation must also be made to provide the proper gangue-ore concentration.

Of course, this initital separation is unnecessary where the supplied ore already contains the proper gangue content, or wherein gangue is added to an ore to provide a proper mixture for use in this specific process.

Reducing gases ascend through the series of reactors 10, 30, 40, 50 at generally normal fluidizing velocities, i.e., velocities ranging generally from about 1 to about 15 feet per second, and preferably from about 3 to about 7 feet per second. Generally, the velocities of the gases through reactors 20, 60 of the series range from about 2 to about 5, and preferably from about 3 to about 4 times the velocity of the gases through reactors 10, 30, 40, 50.

In forming feeds or charges to the process it is generally desirable to grind the gangue to particle sizes at least as small as the ore. The gangue must be ground to particle sizes sufficiently small to be elutriated from the process, i.e., to sizes smaller than about 4 mesh (Taylor screen) and preferably smaller than 100 mesh. Often it is possible to preferentially grind the gangue.

While magnets of desired field strength and size are available and can be utilized to aid in the elutriation steps, a particularly desirable apparatus combintaion which has been employed successfully is one providing a circular holder which carries a plurality of magnets, diametrically oriented, one with respect to the other, on opposite sides of the reactor. The holder is rotatable, and rotation of the holder moves the magnet and consequently the magnetic field around the reactor through which is passed the mixture of gangue and magnetite or reduced iron. Vertically aligned vanes located within the reactors cooperate in effecting the separation. The specific features of the reactor and the magnet, per se, are described in my copending application S.N. 503,106 filed Oct. 23, 1965.

It is apparent that modifications and changes can be made without departing the spirit and scope of the invention.

Having described the invention, what is claimed is:

1. In a process for the production of metallic iron from particulate iron ores fed into the process, separated into a series of beds, fluidized by gas, and progressively reduced at temperatures ranging from about 1000° F. to about 1800° F., the improvement comprising an ore of gangue content ranging from about 3 to about 30 percent, based on the total weight of the ore, in the final fluidized bed of the series, elutriating the gangue from the ore by injecting gas through the bed at velocities ranging from about 1 to about 15 feet per second, reducing the ore sufficiently to provide metallizations ranging from about 70 to 98 percent, imposing a magnetic field across the bed to hold back and concentrate the metallized particles while the gangue is separated therefrom by the gases, and then recovering the metallized product.

2. The process of claim 1 wherein the velocity of the gas through the final fluidized bed ranges from about 3 to about 7 feet per second, metallization ranges from about 80 to about 95 percent, and the operating temperature ranges from about 1100° F. to about 1500° F.

3. The process of claim 1 wherein oxidic iron ore is fed into the process and reduced.

4. The process of claim 1 wherein the several fluidized beds of the series include
   an initial low temperature preheat bed wherein ores are reduced to substantially magnetic oxide of iron,
   a bed wherein magnetic oxide is subsequently reduced to substantially ferrous oxide,
   a preliminary bed wherein ferrous oxide is partially reduced to metallic iron,
   said beds preceding the final ferrous reduction bed wherein the elutriation is effected.

5. In a process for the production of metallic iron from particulate iron ores having a gangue content greater than from about 3 to about 30 percent, based on the total weight of the ore, staged in a series of zones containing beds of ore, fluidized by gas, and progressively reduced, the improvement comprising:
   preheating and reducing the ore in an initial low temperature preheat zone wherein gangue-containing ores are reduced to substantially magnetic oxide of iron,
   preliminarily elutriating and reducing the magnetic oxides of iron to ferrous oxide in a preliminary elutriation zone wherein a portion of the gangue is separated from the magnetic oxide of iron by imposing a magnetic field across said zone while gas is injected therein to provide ore of desired gangue content for subsequent processing, and the gangue content of the ore is reduced to from about 3 to about 30 percent, based on the total weight of the ore,
   partially reducing the ferrous oxide to metallic iron in a ferrous reduction zone, and
   elutriating and substantially reducing the remainder of the ferrous oxide containing from about 3 to about 30 percent gangue, based on the total weight of the ore, in a final ferrous reduction zone by injection of gas through the zone at velocities ranging from about 1 to about 15 feet per second while reducing the ore sufficiently to provide metallization ranging from about 70 to 98 percent, while imposing a magnetic field across the zone to hold back and concentrate the metallized particles while the gangue is separated therefrom by the gases, and while recovering the metallized product.

6. The process of claim 5 wherein the velocities of the gas through the preliminary elutriation zone ranges from about 1 to about 12 feet per second.

7. The process of claim 5 wherein the oxidic iron ore is reduced to substantially magnetic oxide of iron in the initial preheating and reducing zone at temperatures ranging from about 1000° F. to about 1600° F.,
   wherein the ore is elutriated with gases at velocities ranging from about 4 to about 8 feet per second in the preliminary elutriation zone to reduce the gangue content to from about 5 to about 20 percent, based on the total weight of the ore,
   wherein ferrous oxide is reduced to from about 20 to about 70 percent metallization, in said ferrous reduction zone, and
   wherein the ore is reduced from about 80 to about 95 percent metallization, in said final ferrous reduction zone.

8. The process of claim 7 wherein at least two ferrous reduction zones precede the final ferrous reduction and elutriation zones.

9. The process of claim 8 wherein metallizations ranging from about 20 to as high as about 70 percent are provided in the first ferrous reduction zone, metallizations ranging as high as about 90 percent are provided in the second ferrous reduction zone, and metallizations ranging as high as about 98 percent are provided in the final ferrous reduction zone.

10. The process of claim 9 wherein the reducing gas fed to the final reduction zone contains substantial hydrogen concentrations.

References Cited

UNITED STATES PATENTS

| | | | |
|---|---|---|---|
| 2,287,663 | 6/1942 | Brassert | 75—3 |
| 2,711,368 | 6/1955 | Lewis | 75—26 |
| 2,871,115 | 1/1959 | Agarwal | 75—26 |
| 2,876,091 | 3/1959 | Reed | 75—26 |
| 2,996,373 | 8/1961 | Agarwal | 75—26 |
| 3,126,276 | 3/1964 | Marshall et al. | 75—26 |

BENJAMIN HENKIN, *Primary Examiner.*